US008399088B2

(12) United States Patent
Deng et al.

(10) Patent No.: US 8,399,088 B2
(45) Date of Patent: Mar. 19, 2013

(54) SELF-ADHERING FLASHING SYSTEM HAVING HIGH EXTENSIBILITY AND LOW RETRACTION

(75) Inventors: Nanlin Deng, Midlothian, VA (US); James Dean Katsaros, Midlothian, VA (US); Mark Allan Lamontia, Landenberg, PA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 933 days.

(21) Appl. No.: 10/966,120

(22) Filed: Oct. 15, 2004

(65) Prior Publication Data

US 2006/0083898 A1 Apr. 20, 2006

(51) Int. Cl.
*B32B 3/26* (2006.01)

(52) U.S. Cl. ............................ 428/152; 428/343; 52/58

(58) Field of Classification Search .................. 428/152, 428/343; 52/58

See application file for complete search history.

(56) References Cited

U.S. PATENT DOCUMENTS

| | | | | |
|---|---|---|---|---|
| 2,721,819 | A * | 10/1955 | Munro | 428/153 |
| 3,169,899 | A | 2/1965 | Steuber | |
| 3,260,778 | A | 7/1966 | Walton | |
| 3,416,192 | A | 12/1968 | Packard | |
| 3,810,280 | A | 5/1974 | Walton et al. | |
| 4,090,385 | A | 5/1978 | Packard | |
| 4,717,329 | A | 1/1988 | Packard et al. | |
| 5,078,935 | A | 1/1992 | Kobayashi et al. | |
| 5,405,643 | A | 4/1995 | Scholz | |
| 5,972,147 | A | 10/1999 | Janis | |
| 5,993,432 | A | 11/1999 | Lodge et al. | |
| 6,114,595 | A | 9/2000 | Moore et al. | |
| 6,491,776 | B2 | 12/2002 | Alper et al. | |
| 6,503,601 | B1 * | 1/2003 | Edvardsen | 428/174 |
| 6,901,712 | B2 * | 6/2005 | Lionel | 52/408 |

FOREIGN PATENT DOCUMENTS

| | | | |
|---|---|---|---|
| GB | 1095393 | * | 12/1967 |
| GB | 2 184 685 | A | 7/1987 |
| WO | WO 00/07045 | A1 | 2/2000 |
| WO | WO 01/81689 | A2 | 11/2001 |

* cited by examiner

*Primary Examiner* — William P Watkins, III

(57) ABSTRACT

A flexible, self-adhering stretchable material with improved stretch and recovery properties is provided as a flashing for use in building openings such as windows. The material includes a microcreped topsheet and a pressure-sensitive adhesive layer. The material extends to the desired length at a low applied force and recovers a low to moderate amount, making it particularly suited for use in the lower corners of window openings.

1 Claim, 3 Drawing Sheets

SELF-ADHERING FLASHING SYSTEM HAVING HIGH EXTENSIBILITY AND LOW RETRACTION

BACKGROUND OF THE INVENTION

1. Field of the Invention

The invention is directed to a stretchable material suitable for use in flashing applications to prevent water intrusion through openings in building structures such as windows and doors.

2. Description of the Related Art

Materials that are installed in openings in building structures to provide protection from water intrusion are known as flashing. Flexible self-adhering flashing materials, sometimes referred to as flashing tapes, provide protection by covering building framing and sheathing. Flexible flashing materials rely on the underlying building framing for primary structural support.

The stretch recoverable flexible flashing material disclosed in PCT application WO 0181689A (Waggoner et al.) comprises a laminate of a nonwoven layer bonded to a waterproof layer with an adhesive, including an array of spandex fibers between the nonwoven layer and the waterproof layer. The spandex fibers provide elasticity to the flashing material. The spandex fibers have strong elastic recovery that results in a retraction force when the flashing is installed. PCT application WO 0181689A discloses that preferably the flashing material has a stretch recovery of at least 90%. The retraction force creates a shear force that opposes the force of the adhesive that holds the flashing in place. This force is strongest over three-dimensional installations such as over windowsills, where the flashing is adhered to surfaces in three dimensions, i.e., a horizontal surface sill surface, a vertical jamb surface and the surface of the planar substrate forming a wall. In such installations, the product may have the tendency to pull back from the planar substrate of the wall, therefore the manufacturer's recommended practice when installing the flashing is to drive mechanical fasteners such as nails or staples through the flashing to ensure that the flashing remains securely in place while the adhesive strength develops.

It is desired to have a flashing material with a lower retraction force at the desired level of extension, obviating the need for mechanical fasteners to hold the flashing material in place. This is especially helpful in the case where the substrate that the flashing is adhered to is a rigid material such as concrete block or masonry where it may be difficult to install the fastener. Other known flashing products include creped self-adhered flexible flashing products Protecto Flex™ produced by Protecto Wrap Company (Denver, Colo.), and Contour™ flexible tape produced by Ludlow Coated Products (Doswell, Va.). These products comprise a creped film laminated to a bulk adhesive layer. None of these products has sufficient levels of extensibility and recovery to cover the surfaces of a three-dimensional windowsill and remain in place in the desired location.

SUMMARY OF THE INVENTION

The invention relates to a stretchable microcreped flashing system comprising a topsheet selected from the group consisting of films, nonwovens, papers, and combinations thereof and a pressure-sensitive adhesive layer bonded to the topsheet, wherein the topsheet has a compaction ratio of at least 55% and the flashing system has a recovery of less than about 50%.

DEFINITIONS

As used herein, the term "window" refers to any opening in a building where flashing would be useful to prevent intrusion of moisture, such as an opening for a window, door, chimney, electrical connection, or piping.

The term "sill" refers to the lower horizontal surface of a window.

The term "jamb" refers to the vertical sides of a window.

The terms "flashing tape," "flashing system," "flashing material," and "flashing" refer interchangeably to a flashing tape comprising a topsheet and a pressure sensitive adhesive.

DETAILED DESCRIPTION OF THE INVENTION

The flashing system of the current invention enables continuous, seamless coverage of irregular-shaped sections in a building enclosure to provide a moisture seal for protection. Examples of irregular-shaped sections in a building enclosure include the complex, multi-surface, two- or three-dimensional shape at the bottom and sides of a window in a building. The flashing system has extension and recovery properties that allow it to be installed covering the interior of the rough opening of the window, particularly the bottom sill and corners, and then stretched and folded to the outside face of the framing and/or sheathing at the corners of the window, thereby forming a seamless three-dimensional covering of the corners of the window.

The flashing system of the invention comprises a microcreped topsheet and a layer of pressure-sensitive adhesive. The topsheet is a stretchable, conformable, flexible water-resistant sheet material. The topsheet can also be a laminate. The topsheet is microcreped to a high degree of compaction, resulting in a high level of extension at a relatively low applied stress.

The flashing system has a relatively low level of recovery so that when stretched during installation, the flashing system will retract somewhat to form a good fit with the window rather than leaving excess material which would buckle on the surface and allow the possibility for water intrusion, however the flashing system will not retract sufficiently to cause the installed flashing system to curl or shear, particularly at corners.

Figure 1:
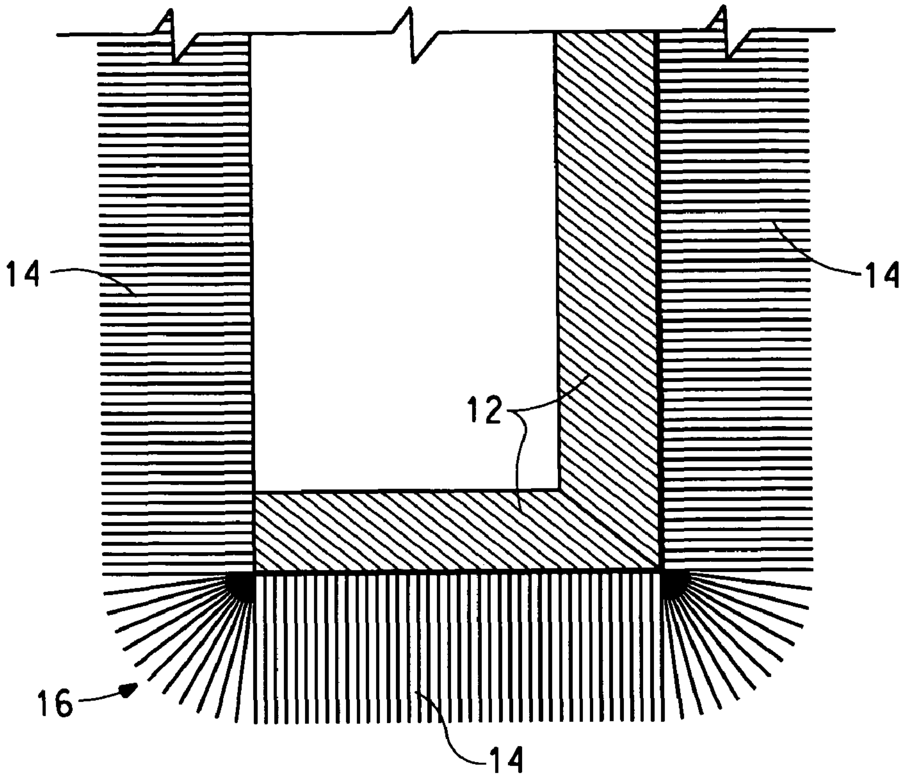
FIG. 1 is a perspective view of a microcreped flashing system positioned into an opening.

FIG. 1 shows the flashing system of the invention installed in the bottom part of a window. Portion 12 of the flashing system is installed inside the window opening on the sill and jambs. Portion 14 of the flashing system extends outside the window opening on the planar wall surface outward from the jambs and downward from the sill. The creped flashing system forms a "fan" structure 16 at the corners. It can be similarly installed in the rest of the window by continuing up the jambs with the flashing system to form two additional fan structures at the upper window corners.

The topsheet may comprise a nonwoven sheet, a film, a paper, or a combination thereof. The topsheet provides the toughness and durability required to prevent tearing when installed around sharp edges of a building and a compatible surface for integration with other building materials (e.g., caulks and sealants). The topsheet must be of sufficient durability to maintain integrity through joint movement between dissimilar materials through environmental cycles, resist abrasive contact with other building materials, and protect the sealing adhesive from UV, water, and surfactant exposure. The topsheet should exhibit minimum surface fuzzing and, in the case of a multilayer combination material, should have high resistance to delamination upon handling during installation. The topsheet can be breathable (vapor-permeable) or non-breathable (non vapor-permeable).

Examples of nonwoven sheet materials suitable for use in the topsheet include spunbonded olefin sheets such as spunbonded polypropylene and polyethylene sheets. Also, polyester, nylon, or bicomponents of polyethylene/polypropylene, polyethylene/polyester, and polypropylene/polyester can be used. The topsheet may be topically treated or coated with an extruded film or layer of coated lacquer in order to improve the water resistance, to improve compatibility with auxiliary caulks and sealants or to enhance ink acceptance during printing, if desired.

The topsheet can be a non-breathable polymeric film. A nonwoven sheet that has been coated with polymeric film layer can also be used. The topsheet can also comprise an elastomeric film. Other polymeric films useful as the topsheet include ethylene vinyl acetate, high density polyethylene, ethylene alpha-olefin copolymers such as Engage® copolymers available from DuPont Dow Elastomers; styrene-butadiene-styrene (SBS); styrene-isoprene-styrene (SIS) block copolymers, such as Kraton® copolymers, available from Shell Chemical Company; breathable films made of Hytrel®, available from E.I. du Pont de Nemours and Company, Wilmington, Del. (DuPont); Pebax® a polyester available from Atofina Chemicals, Inc., Philadelphia Pa.; polyurethane; microporous polytetrafluoroethylene (PTFE); polyolefin films; or composites thereof.

Advantageously, the topsheet is a nonwoven sheet that has been coated with a film made of blends of low-density polyethylene and linear low-density polyethylene film about 0.5 to 2.0 mils (0.01 to 0.05 mm) thick. In one embodiment, the topsheet is a flash-spun high-density polyethylene sheet having a basis weight of 0.6-3.5 oz/yd$^2$ (20.3-118.7 g/m$^2$). An example of such a sheet is Tyvek® flash spun polyethylene manufactured by DuPont. The preparation of flash-spun nonwoven plexifilamentary film-fibril sheets is described in Steuber, U.S. Pat. No. 3,169,899, which is hereby incorporated by reference. The sheet may be bonded using a thermal calender bonder such as that described in U.S. Pat. No. 5,972,147, which is hereby incorporated by reference.

According to the present invention, the topsheet is microcreped to a compaction ratio of greater than 55% and more advantageously between about 60% and about 85%. The term "compaction ratio" herein refers to the degree that a creped or microcreped material has been compacted relative to its fully extended state. Compaction ratio is herein defined as: [(uncompacted topsheet length−compacted topsheet length)/uncompacted topsheet length]×100. This high degree of compaction facilitates the stretching of the sheet to the high extension levels desired for three-dimensional flashing installations at a lower applied force than is possible in currently known products.

An apparatus and process for microcreping the topsheet is described in U.S. Pat. Nos. 3,260,778; 3,416,192; 3,810,280; 4,090,385; and 4,717,329, hereby incorporated by reference. The microcreping process employed may be the microcreping process commercially available from the Micrex Corporation of Walpole, Mass., referred to by the registered mark of the same company as "MICREX." In the microcreping process, a means for imparting pressure applies a predetermined amount of pressure extending across the path of a continuously supplied planar sheet. The sheet is carried by a rotating drive roll on which the pressure is imparted through the sheet and against the rotating drive roll. The rotating drive roll has either a grooved surface or a flat (non-grooved) surface. While the sheet is under applied pressure, it then further impinges upon a flat retarding surface. The sheet is directed to the space between the retarding surface and a creping blade positioned in the path of the sheet. The creping blade is flat when the drive roll surface is flat. The creping blade is combed when the drive roll surface is grooved. The retarding surface in combination with the applied pressure induces the sheet into a creped form, with a resulting distortion of the planar aspect of the original sheet. The amplitude of the waves (crest to trough) and the length of the waves in the creped sheet are initially determined by the amount of space between the surface of the drive roll and the retarding surface and the space between the crepe blade and the retarding surface. The amplitude and length of the waves in the creped sheet is further adjusted by adjusting the speed of the take-up roll. The lower the speed of the take-up roll, the greater the amplitude of the waves and the shorter the wavelength.

The compaction ratio depends on the combination of the amplitude and the frequency of the crepes in the microcreped topsheet of the flashing system. The compaction ratio of a high amplitude, low frequency topsheet may be the same as a low amplitude, high frequency topsheet, provided the uncompacted and compacted lengths of the topsheet are substantially the same.

Figure 2:
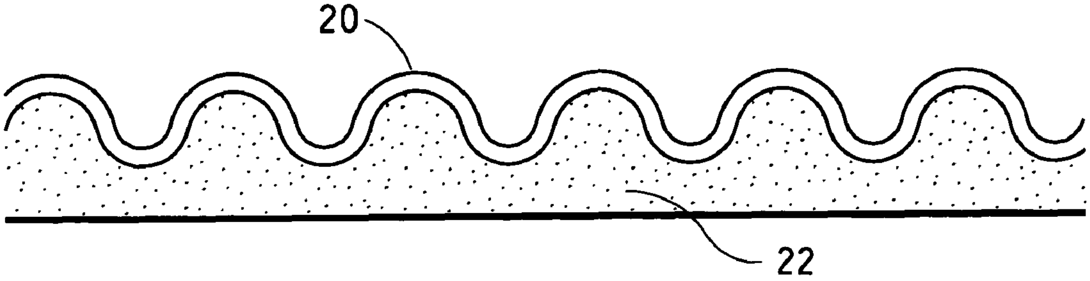
FIG. 2 is a schematic side view of a flashing system including a microcreped topsheet and a pressure sensitive adhesive layer.

As shown in FIG. 2, the flashing system of the invention comprises the stretchable, microcreped topsheet 20 described above and an elastomeric pressure-sensitive adhesive layer 22 laminated thereto for adhering the flashing system to window openings. When stretched to about 90% of the maximum strain of the flashing system, i.e., 90% of the strain at break and allowed to relax, the flashing system has a recovery of less than about 50%, and more advantageously less than about 35%. A flashing system having a recovery in this range has an improved ability to remain in place after installation without pulling back from the surface on which it is adhered. Therefore, less adhesive strength is needed to keep the flashing in place. Likewise, mechanical fastening is not needed which is typically impractical on concrete or metal surfaces.

The topsheet advantageously has sufficient water holdout capability to prevent water from contacting the adhesive layer. Advantageously, the topsheet has a hydrostatic head (also referred to as "hydrohead") of at least 10 inches (25.4 cm), more advantageously at least 40 inches (101.6 cm). In cases where the initial bond strength of the adhesive layer is increased in the presence of moisture, it may be desirable for the topsheet to be breathable, for example a perforated film or breathable nonwoven. The topsheet should have a structure that is sufficiently closed to contain the adhesive so that the adhesive does not extend through the topsheet to the outer surface of the material.

The pressure sensitive adhesive layer is advantageously a synthetic butyl rubber-based sealant. Building adhesives comprising asphalt and rubber can also be used, such as compositions comprised of bitumen and rubber and, optionally, additives selected from mineral oil, resin, etc. The rubber may be vulcanized or unvulcanized rubber, for example natural or synthetic rubbers such as styrene-butadiene rubber, and the like. The pressure sensitive adhesive layer should have sufficient adhesive strength to adhere the flashing system to a building structure comprising materials such as wood, oriented strand board (OSB), rigid polystyrene foamboard, polyvinyl chloride, Tyvek® flash spun polyethylene housewrap, other plastic materials used for housewrap applications, asphalt impregnated papers, etc. The pressure-sensitive adhesive layer can be applied with full or partial coverage. As a full coverage layer, the pressure-sensitive adhesive layer can be applied about 5-60 mils (0.13-1.52 mm) thick and preferably about 10-40 mils thick (0.26-1.02 mm). The pressure-sensitive adhesive layer should be thick enough that when the flashing system is stretched during installation, the adhesive layer does not thin so much that tears form in the adhesive layer. The pressure-sensitive adhesive can be applied to the flashing system by extruding or otherwise applying the adhesive through a narrow slot onto the surface of the topsheet intended to be adhered to the window opening. A release paper is applied in one or more sections to cover the pressure-sensitive adhesive layer, advantageously in two overlapping sections along the width of the flashing system. The flashing system is not in an extended state during extrusion of the pressure-sensitive adhesive layer. The pressure-sensitive adhesive layer advantageously covers substantially the entire exposed surface of the topsheet. The flashing system with the pressure-sensitive adhesive layer can be wound onto cores and packaged. The flashing system can be any width that is convenient for flashing windows.

The flashing system is flexible and has sufficiently low stiffness to be installed around corners and remain in place over time. One measure of the stiffness of the flashing system is bending stiffness calculated as described herein. The flashing system advantageously has a bending stiffness of less than about 1 in-lb.

The stretchable flashing system is installed in the window opening so that the bottom corners of the opening are covered in a seamless, three-dimensional manner and a path for draining incidental water is provided. Procedures for installing stretchable flashing tapes are known.

Test Methods

Basis Weight was determined by ASTM D-3776, which is hereby incorporated by reference, and is reported in $g/m^2$.

Topsheet Thickness was determined by ASTM method D 1777-64, which is hereby incorporated by reference, and is reported in microns.

Flashing System Thickness was determined using an "Ames" style gauge having a digital transducer connected to a ½" diameter circular foot pressing on a rigid steel base. The pressure on the material under the foot was about 2.5 psi. Readings were taken in 3 places and averaged for each specimen. Dimensions were recorded to the nearest 0.0001 in. Prior to testing, the gauge is lowered on the base and zeroed. The foot is raised, the sample is placed on the base, and then the foot is lowered. The reading is stabilized after a brief period (due to slight compression by the foot pressure) and the reading is recorded.

Adhesive Layer Thickness was determined as follows. A sharp razor blade was used to cut a one-inch long by ¼-inch wide sample of the flashing system including top sheet and adhesive layers. The sample was then mounted to a glass slide using double-sided tape with one cross-sectional side sticking to the glass slide. The glass slide was placed under a stereo microscope (available from Leica Microsystems AG) with a polarizing filter in place with the zoom magnification set at 2.5×. Multiple microphotographs were taken to capture the entire one-inch length of the sample and were saved in the "TIFF" imaging format. For sample analysis, "Image-Pro" software (available from Media Cybernetics) was used to measure the thickness of the adhesive by comparing the image to a calibrated measurement. Adhesive thickness reported was based on an average of at least six measurements made on the image.

Tensile Strength was determined for the nonwoven layers by ASTM D 1682, Section 19, which is hereby incorporated by reference, with the following modifications. In the test, a 2.54 cm by 20.32 cm (1 inch by 8 inch) sample was clamped at opposite ends of the sample. The clamps were attached 12.7 cm (5 in) from each other on the sample. The sample was pulled steadily at a speed of 5.08 cm/min (2 in/min) until the sample broke. The force at break was recorded in Newtons/2.54 cm as the breaking tensile strength. The area under the stress-strain curve was the work to break.

Hydrostatic Head is a measure of the resistance of the sheet to penetration by liquid water under a static load. A 7×7 in (17.78×17.78 cm) sample is mounted in a SDL 18 Shirley Hydrostatic Head Tester (manufactured by Shirley Developments Limited, Stockport, England). Water is pumped against one side of a 102.6 $cm^2$ section of the sample at a rate of 60±3 cm/min until three areas of the sample are penetrated by the water. The measured hydrostatic pressure is measured in inches, converted to SI units and given in centimeters of water. The test generally follows AATCC-127 or ISO 811.

Moisture Vapor Transmission Rate (MVTR) is determined by ASTM E398-83 (which has since been withdrawn), which is hereby incorporated by reference. MVTR is reported in $g/m^2/24$ hr. MVTR data acquired by ASTM E398-83 was collected using a LYSSY MVTR tester model L80-4000J and is identified herein as "LYSSY" data. LYSSY is based in Zurich, Switzerland. MVTR test results are highly dependent on the test method used and material type. Important variables between test methods include the water vapor pressure gradient, volume of air space between liquid and sheet sample, temperature, air-flow speed over the sample and test procedure. ASTM E398-83 (the "LYSSY" method) is based on a vapor pressure "gradient" of 85% relative humidity ("wet space") vs. 15% relative humidity ("dry space"). The LYSSY method measures the moisture diffusion rate for just a few minutes and under a constant humidity delta, which measured value is then extrapolated over a 24 hour period.

Delamination Strength of a nonwoven sheet sample is measured using a constant rate of extension tensile testing machine such as an Instron table model tester. A 1.0 in (2.54 cm) by 8.0 in (20.32 cm) sample is delaminated approximately 1.25 in (3.18 cm) by inserting a pick into the cross-section of the sample to initiate a separation and delamination by hand. The delaminated sample faces are mounted in the clamps of the tester that are set 1.5 in (3.81 cm) apart. The tester is started and run at a cross-head speed of 5.0 in/min. (12.7 cm/min.). The computer starts picking up readings after the slack is removed in about 0.5 in (1.27 cm) of crosshead travel. The sample is delaminated for about 4 in (10.16 cm) during which readings are taken and averaged. The average delamination strength is given in N/cm. The test generally follows the method of ASTM D 2724-87, which is hereby incorporated by reference. The delamination strength values reported for the examples below are each based on an average of at least three measurements made on the sheet.

Compaction Ratio (Optical Method) of flashing samples was calculated as [(uncompacted topsheet length−compacted topsheet length)/uncompacted topsheet length]×100.

The uncompacted topsheet length and the compacted topsheet length of a flashing sample were determined by the following method:

Scanning Electron Micrographs (SEMs) are made of a cross-section of the flashing sample, allowing direct observation of the undulation or compaction of the microcreped topsheet of the flashing system. Multiple SEMs are taken to create a montage that includes a flashing length of at least six times the amplitude of the topsheet crepe. If the amplitude of the flashing undulation is x, enough SEMs must be taken to create a montage of length 6x or more.

Next the layer in the flashing system that limits the ultimate extension (i.e., the least extensible layer or the innermost layer of the topsheet) is identified. This is herein referred to as the "extension-limiting layer." The SEMs are imported into an image processing computer program, e.g., Adobe PhotoShop™ (available from Adobe Systems Incorporated, San Jose, Calif.). Using the computer program, the individual SEMs are coupled into a montage. Then, the path of the extension-limiting layer of the topsheet is marked across the micrograph from left to right using enough points to define the path of the extension-limiting layer. The greater the amplitude or the frequency of the undulations, the greater the number of points necessary to define the path.

The points are then exported to a math program such as Microsoft Excel as x-y coordinates. The program sums the lengths between consecutive points to determine the overall path length. This is herein referred to as the "uncompacted topsheet length."

The distance between the first point on the left end of the SEM montage and the last point on the right end of the montage is calculated. This is the "compacted topsheet length."

The compaction ratio is then computed as follows:

Compaction Ratio=(uncompacted topsheet length−compacted topsheet length)/uncompacted topsheet length.

However, the compaction ratios for Examples 1 and 2, below, were calculated as [1−100/(100+strain)], where the strain is the amount of extension (expressed as a percentage of the compacted length) at which the sample is completely elongated, prior to any stretching of the topsheet. It was found that the Optical Method for measuring compaction ratio is unsuitable for use with the topsheets of Examples 1 and 2 because these topsheets consist of plexifilamentary film-fibril material, which expands in thickness in some cross-sectional locations when compacted and not in others, making it very difficult to follow the path of the topsheet in a continuous manner.

Strain at Break is determined as follows. Samples are taken from the machine direction of a roll of sheet material. Both full width product and cut strips may be used, however narrower strips are easier to grip without slippage since the samples thin significantly as stretched to high strains. Samples ½" wide with a 5" gage (7" overall length) are preferred. The samples are conditioned at least 40 hrs at 23° C. 50% RH prior to testing. The samples are tested in a constant-rate-of-extension (CRE) type tensile testing machine with two air grips, one on the moving cross head and one on the fixed part of the test frame.

A minimum of three samples is used.

Sample Preparation: The test gage is marked on the sample prior to cutting to insure that the specimen is not inadvertently extended when mounting in the grips. The thickness of the samples is measured with the release paper in place and the thickness of the release paper is subtracted. The thickness is recorded with the tensile data. The release paper is peeled at the ends outside the gage, and the end having exposed adhesive is stretched as far as possible. Tape is wrapped around the exposed end beyond the gage line; this is repeated on the opposite end. This thins the ends outside the test region, preventing slippage inside the grips.

Test Procedure: The sample is inserted in the air grips with the gage lines lined up with the grip faces, then the release paper is removed from the test gage. The CRE machine is run until the sample breaks at 100%/min (5 in/min with the ½"×5" gage). The maximum load in lb/in and the percent strain at break were recorded for individual samples and the average of the samples.

The samples were subsequently extended to 90% of the strain at break and this strain and the associated load in lb/in were recorded for each sample.

Recovery of a sample is determined as follows. Strain at break of the sample is determined as described herein, and then 90% of the strain at break is calculated. The same sample preparation is used as described in the Strain at Break test method. The sample is placed in the CRE machine and loaded until it reaches 90% of the strain at break, and then unloaded at the same rate until the sample becomes totally slack. The point at which the sample no longer carries any load on the return cycle is marked and this sample length is referred to as the recovered length. From this, Percent Permanent Set is calculated as [(recovered length−original length)/original length]×100. Recovery is the percentage the sample recovers and is calculated as [(Percent Strain at 90% of Strain at Break−Percent Permanent Set)/Percent Strain at 90% of Strain at Break]×100.

Low Extension Recovery of a sample is determined as follows. The same sample preparation is used as described in the Strain at Break test method. The sample is placed in the CRE machine and loaded until it reaches 10% strain (i.e., the extended length is 1.1× the original length), and then unloaded at the same rate until the sample becomes totally slack (i.e., no tension is applied to the sample). The percent strain at which the sample no longer carries any load as the sample is unloaded is marked. This is referred to as the Low Extension Permanent Set. Low Extension Recovery is the percentage the sample recovers and is calculated as (strain−Low Extension Permanent Set)/strain×100. (Strain should be 10%.)

Bending Stiffness is determined as follows. The test uses a 3 point bending fixture described in ASTM D 790, with ⅛" diameter contact points and a ½" fixed span with a 5" long contact length. The 3 point bending fixture is attached to a constant rate of extension machine (CRE) capable of 0.1 in/min compression with load measuring ability of 0 to 200 g, with the center point load on top and the rest below. Test samples are cut 1" by 4" with the test direction in the 1" length. The samples are conditioned at least 40 hours at 23° C. and 50% relative humidity (RH). Sample thickness is measured at three points and averaged. Flashing with adhesive is measured with the release paper attached and then the release paper is measured separately and subtracted to give the sample thickness. Samples are tested centered on the three-point flex fixture. The adhesive side is placed facing up (center point load). The sample is then loaded at 0.1 in/min, and deflection is recorded. The slope of the initial region of the load deflection curve is determined and the modulus is determined according to ASTM D 790 assuming a uniform thickness rectangular sample. (This is a simplification for creped sheet products.) Bending Stiffness is calculated as this modulus times the thickness cubed.

EXAMPLES

Example 1

A point bonded soft structure nonwoven flash-spun polyethylene plexifilamentary film-fibril sheet having a basis weight of 1.2 oz/yd$^2$ (41 g/m$^2$) was used as the topsheet. This sheet, commercially available under the trade name Tyvek®, Style 1422A, by E. I. du Pont de Nemours and Company (Wilmington, Del.), has the properties shown in Table 1.

TABLE 1

| Tensile Strength | |
|---|---|
| Machine direction | 7.4 lb/in (1296 N/m) |
| Cross-machine direction | 8.4 lb/in (1471 N/m) |
| Thickness | 4.2 mils (107 μm) |
| Hydrostatic head | 42.9 inch (109.03 cm) |
| Delamination Strength | 0.08 lb/in (14 N/m) |
| MVTR | 1764 g/m$^2$/24 hr |
| Bending Modulus | 12.3 ksi |

The bonded sheet was creped at a compaction ratio of 75% using a Micrex Microcreper machine manufactured by Micrex Corporation (Walpole, Mass.) by the method described above.

The creped material was then coated with 28.6 mil (0.726 mm) of a butyl rubber based adhesive to form a flashing system. The butyl rubber adhesive was first extruded to a releaser liner. The release liner was perforated so that for the 7-inch product, a 4-inch (10.2 cm) section across the width of the butyl adhesive could be exposed separate from the remaining 3-inch (15.24 cm) section of the butyl adhesive. After the extrusion, the butyl rubber adhesive was covered with creped material as it was unwound at minimum tension. The properties of the creped flashing product with butyl rubber adhesive are shown in Table 4.

Example 2

A point bonded soft structure Tyvek® flash-spun polyethylene plexifilamentary film-fibril sheet, Style 1450BS, having a basis weight of 1.38 oz/yd$^2$ (47 g/m$^2$) was used as the substrate for the flashing material. The sheet has the properties shown in Table 2.

TABLE 2

| Tensile Strength | |
|---|---|
| Machine direction | 12.2 lb/in (2140 N/m) |
| Cross-machine direction | 10.9 lb/in (1910 N/m) |
| Thickness | 4.2 mils (107 μm) |
| Hydrostatic head | 44.9 inch (114 cm) |
| Delamination Strength | 0.167 lb/in (29 N/m) |
| MVTR | 1601 g/m$^2$/24 hr |
| Bending Modulus | 34.4 ksi |

The bonded sheet was creped at a machine setting of 85% compaction using a Micrex Microcreper machine manufactured by Micrex Corporation (Walpole, Mass.).

The creped material was then coated with 37 mil (0.94 mm) of a butyl rubber based adhesive to form a flashing system, as described in Example 1. The properties of the creped flashing product with butyl rubber adhesive are shown in Table 4.

Examples 3 to 6

A laminate sheet was used as the substrate for the flashing material in Comparative Example 3 and Examples 4 to 6. A consolidated nonwoven Tyvek® flash-spun polyethylene plexifilamentary film-fibril sheet, Style 1041BS, having a basis weight of 1.44 oz/yd$^2$ (49 g/m$^2$) was used as the starting material for the laminate. The Tyvek® sheet was vacuum coated with a 1.8 mil black film composed of 45% linear low density polyethylene (LLDPE) with melt flow rate of 3.5 g/10 min, 50% low density polyethylene (LDPE) with melt flow rate of 3.5 g/10 min, both obtained from Equistar Chemicals LP (Houston, Tex.), 4% carbon black masterbatch and 1% UV additive masterbatch from Ampacet (Tarrytown, N.Y.). The properties of the laminate sheet are shown in Table 3. Each sample of the laminate (Examples 3-6) was creped using a Micrex Microcreper machine manufactured by Micrex Corporation (Walpole, Mass.) at a compaction ratio machine setting per Table 4.

TABLE 3

| Tensile Strength | |
|---|---|
| Machine direction | 24.4 lb/in (4270 N/m) |
| Cross-machine direction | 34.6 lb/in (6060 N/m) |
| Thickness | 7.2 mils (180 μm) |
| Hydrostatic head | >197 inch (>500 cm) |
| Delamination Strength | 0.33 lb/in (57 N/m) |
| MVTR | <1 g/m$^2$/24 hr |
| Bending Modulus | 33.5 ksi |

The creped laminate material was then coated with a butyl rubber-based adhesive to form a flashing system, as described in Example 1. The properties of the creped flashing product are shown in Table 4. The Compaction Ratios were measured according to the Optical Method described in the Test Methods.

TABLE 4

| | Ex. 1 | Ex. 2 | Comp Ex 3 | Ex. 4 | Ex. 5 | Ex. 6 | Comp Ex 7 | Comp Ex 9 |
|---|---|---|---|---|---|---|---|---|
| Butyl thickness, mil/(mm) | 28.6/(0.73) | 37/(0.94) | 33/(0.84) | 22.5/(0.57) | 29.7/(0.75) | 27.6/(0.70) | 39/(0.99) | 63/(1.6) |
| Total Thickness, mil/(mm) | 39.5/(1.0) | 58/(1.5) | 51/(1.3) | 58.6/(1.5) | 53.5/(1.4) | 58/(1.5) | 75/(1.9) | 76/(1.9) |
| Compaction Ratio % | 77.8 | 83.7 | 53.3 | 55.9 | 57.6 | 65 | 34.5 | 30.9 |
| Force required at 90% of maximum strain, lb/in/(N/cm) | 3.08/(1.76) | 3.26/(1.86) | 11.1/(6.34) | 17.9/(10.2) | 19.5/(11.1) | 8.76/(5.00) | 2.58/(1.47) | 3.42/(1.95) |

TABLE 4-continued

| | Ex. 1 | Ex. 2 | Comp Ex 3 | Ex. 4 | Ex. 5 | Ex. 6 | Comp Ex 7 | Comp Ex 9 |
|---|---|---|---|---|---|---|---|---|
| Strain, % | 352 | 503 | 142 | 175 | 190 | 269 | 90 | 56 |
| Permanent set, % | 332 | 483 | 93.9 | 136 | 146 | 206 | 65 | 33 |
| Recovery, % | 5.8 | 4 | 34 | 22 | 23 | 23 | 28 | 41 |
| Force required at 10% strain, lb/in/(N/cm) | [1]0.33/(0.19) | 0.25/(0.14) | 0.32/(0.18) | 0.37/(0.21) | 0.29/(0.16) | 0.35/(0.20) | 0.39/(0.22) | 0.54/(0.31) |
| Permanent set, % | 3.20 | 3.45 | 2.89 | 3.22 | 2.76 | 2.75 | 2.9 | 4.0 |
| Recovery, % | 64.2 | 65.5 | 71.2 | 67.8 | 72.4 | 72.5 | 71 | 60 |
| Bending Stiffness, in-lb/(N-cm) | 0.29/(0.026) | 0.64/(0.057) | 0.39/(0.034) | 0.41/(0.036) | 0.48/(0.042) | 0.74/(0.065) | 0.72/(0.064) | 0.42/(0.037) |

[1]Strain for Example 1 was 8.92%.

Figure 3:
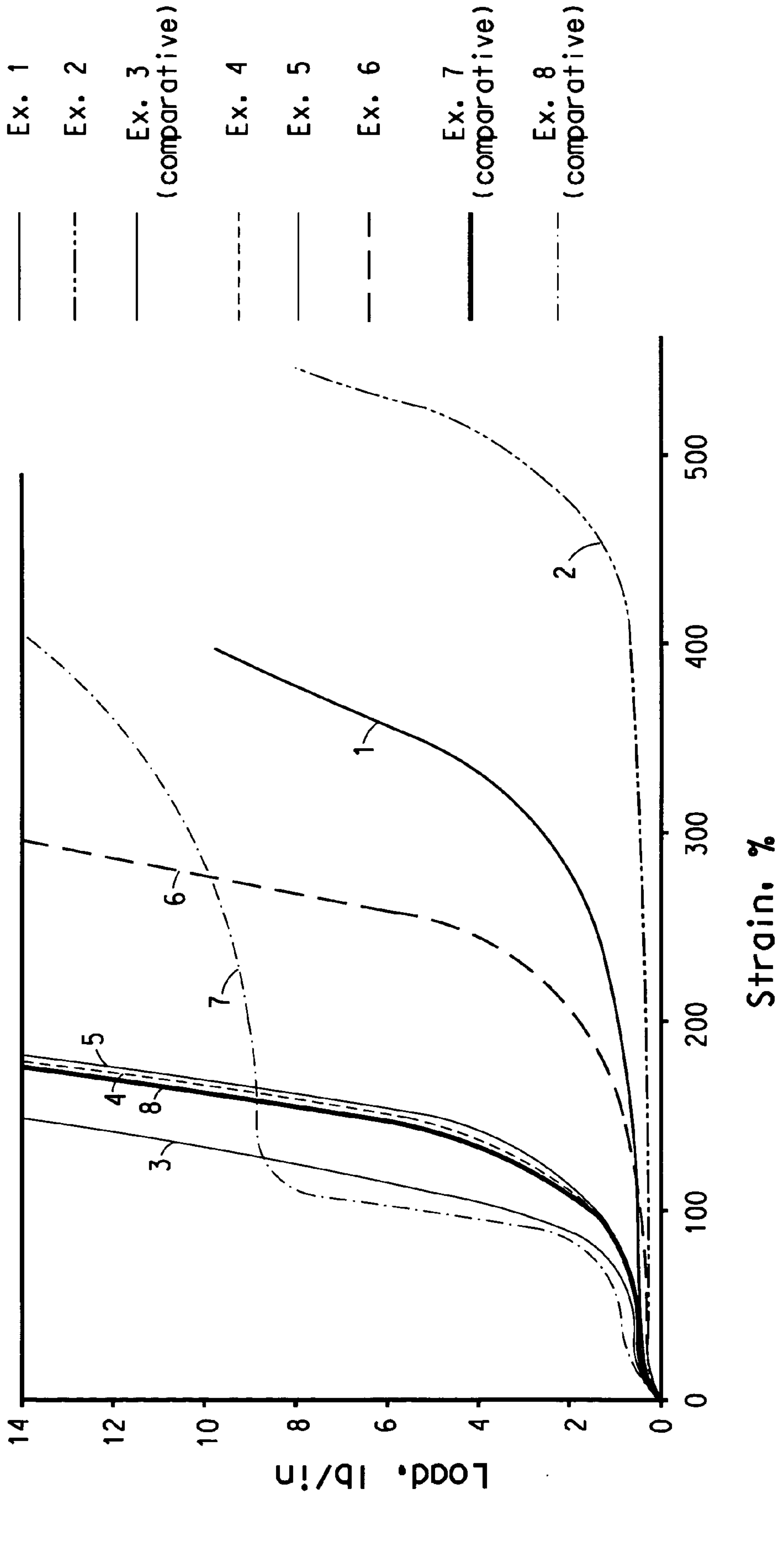
FIG. 3 is a set of stress-strain curves illustrating the extension of various flashing materials (measured in distance units) as an increasing level of force is applied (measured in force units).

Samples of the flashing systems of Examples 1-2, 4-6, and Comparative examples 3, 7, and 8 were extended using a constant-rate-of-extension (CRE) machine as described in the Strain at Break Test Method to obtain the stress-strain curves as shown in FIG. 3. The strain at which the flashing failed was determined to be the maximum extension for each sample. Comparative Example 3 is a flashing system differing from the subject invention in that it does not exhibit the minimum compaction ratio of 55%. Comparative Example 7 is Contour™, Comparative Example 8 is FlexWrap®, and Comparative Example 9 is Protecto Flex™, produced by Protecto Wrap Company (Denver, Colo.).

As can be seen in FIG. 3 in the stress-strain curves of the examples of the invention (Examples 1-2, 4-6), there are three distinct zones. At low stress levels, there is a relatively flat portion of the curve in which the flashing system extends to a high degree with a corresponding low rise in stress, as the crepe in the flashing unfolds. It has been found that the flashing advantageously extends at least about 150% in use to be installed around a corner without foreshortening after installation, preferably between about 150% and about 570%. The unfolding of the crepe takes little force, therefore most of the stress is applied to the compliant adhesive layer. At high stress levels, the flashing topsheet is being drawn in tension. At intermediate stress levels, stress is accumulated at an increasing rate as the topsheet is extended.

As can be seen in FIG. 3, the examples of the flashing of the invention extend to a strain of at least 150%, which has been found to be necessary for a good installation, at a lower applied stress than the comparative examples, i.e., less than 5.7 lb/in (10 N/cm).

Separate pieces of the same samples used to generate the stress-strain curves of FIG. 3 were then extended to 90% of maximum extension and the load was released. The extension value of 90% of maximum was chosen to reflect the actual extension of the flashing in use in installations around windowsill corners, as measured in experimental window installations. The stress-strain recovery curve was recorded during the unloading of the flashing until the flashing reached the permanent set, or the final length of the flashing after the load is released. The numeric values for the strain at 90% of maximum extension, the permanent set, the recovery (expressed as a percentage) and the compaction ratio are given in Table 4.

Figure 4:
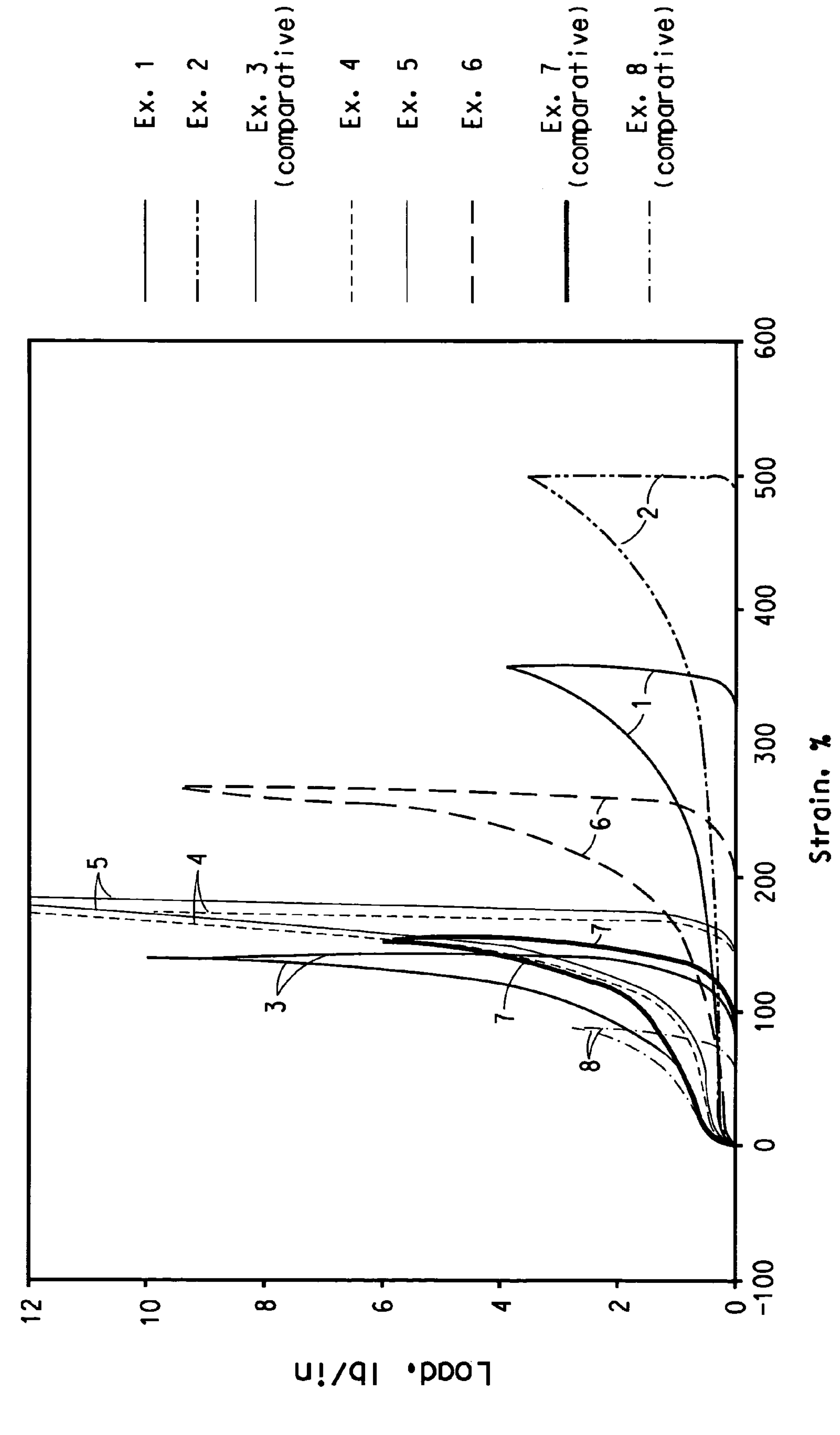
FIG. 4 is a set of hysteresis curves illustrating the strain of various flashing materials (measured in distance units) as an increasing level of force is applied (measured in force units) and subsequently released.

Hysteresis curves, including both the stress-strain curves during the application of the load and the recovery curve of the stress vs. strain after the release of the load, are given in FIG. 4. As can be seen from the recovery curves, upon release of the load, each flashing sample recovers to its "permanent set," or the final amount of strain relative to the original length of the sample. The higher the level of recovery, the stronger the retraction forces in the flashing and the more likely the sample is to foreshorten in use, by shearing on the wall surface or peeling away from the wall. Examples 1-2 and 4-6 recover a moderate amount, less than about 50%, as compared with Comparative Example 8, which was found to recover 74%. A recovery of less than about 50% in the flashing is desirable to avoid foreshortening in use. Some recovery in the flashing is advantageous since it allows the flashing to "even out" after being installed, so that indentations from the installer's fingertips, for example, will not create undesirable wrinkles in the surface of the flashing.

FIGS. 3 and 4 illustrate that Examples 1-2 and Examples 4-6 of the invention have a unique combination of the necessary extension and recovery for application in window corner installations.

It has also been found that during installation of the flashing system, it is helpful if the system recovers to a great degree at low levels of extension or strain, e.g., about 10%. Advantageously, the system recovers at least 50% after being extended 10%. This permits the system to be repositioned as needed to achieve a desired installation.

What is claimed is:

1. A flashing system consisting of a microcreped topsheet having a compaction ratio of at least about 55% and a pressure-sensitive adhesive layer bonded to one surface of the topsheet, wherein the flashing system has a recovery of between about 4% and about 50% and the topsheet is microcreped in only one direction, wherein the flashing system extends to at least 150% when exposed to an applied stress no greater than 10 N/cm.

* * * * *